(12) United States Patent
Cai

(10) Patent No.: US 10,572,078 B2
(45) Date of Patent: Feb. 25, 2020

(54) TOUCH ELECTRODE LAYER AND TOUCH PANEL

(71) Applicants: BOE Technology Group Co., Ltd., Beijing (CN); Beijing BOE Optoelectronics Technology Co., Ltd., Beijing (CN)

(72) Inventor: Peizhi Cai, Beijing (CN)

(73) Assignees: BOE Technology Group Co., Ltd., Beijing (CN); Beijing BOE Optoelectronics Technology Co., Ltd., Beijing (CN)

(*) Notice: Subject to any disclaimer, the term of this patent is extended or adjusted under 35 U.S.C. 154(b) by 119 days.

(21) Appl. No.: 15/531,588

(22) PCT Filed: Mar. 14, 2016

(86) PCT No.: PCT/CN2016/076262
§ 371 (c)(1),
(2) Date: May 30, 2017

(87) PCT Pub. No.: WO2016/173328
PCT Pub. Date: Nov. 3, 2016

(65) Prior Publication Data
US 2018/0284918 A1    Oct. 4, 2018

(30) Foreign Application Priority Data
Apr. 30, 2015  (CN) .......................... 2015 1 0219241

(51) Int. Cl.
*G02F 1/1335* (2006.01)
*G06F 3/044* (2006.01)
(Continued)

(52) U.S. Cl.
CPC .......... *G06F 3/044* (2013.01); *G02F 1/13338* (2013.01); *G02F 1/134309* (2013.01)

(58) Field of Classification Search
CPC ....................... G02F 1/13338; G02F 1/134309
(Continued)

(56) References Cited

U.S. PATENT DOCUMENTS

| 8,878,768 | B2 * | 11/2014 | Nagata | .................... | G06F 3/041 |
| | | | | | 345/104 |
| 2008/0278178 | A1 * | 11/2008 | Philipp | .................. | G06F 3/044 |
| | | | | | 324/662 |

(Continued)

FOREIGN PATENT DOCUMENTS

| CN | 102830850 A | 12/2012 |
| CN | 102902415 A | 1/2013 |

(Continued)

OTHER PUBLICATIONS

Jun. 3, 2016—(WO) International Search Report and Written Opinion Appn PCT/CN2016/076262 with English Tran.
(Continued)

*Primary Examiner* — Paisley L Wilson
(74) *Attorney, Agent, or Firm* — Banner & Witcoff, Ltd.

(57) ABSTRACT

A touch electrode layer and a touch panel are provided. The touch electrode layer includes a first touch electrode and a second touch electrode. At least a part of the first touch electrode is surrounded by the second touch electrode so that the first touch electrode has a first touch electrode portion surrounded by the second touch electrode, and the first touch electrode portion surrounded by the second touch electrode is of a circular or oval shape; a first gap is formed between the first touch electrode portion and the second touch electrode which surrounds the first touch electrode portion; and the first touch electrode and the second touch electrode are arranged in a same layer.

17 Claims, 6 Drawing Sheets

(51) Int. Cl.
 *G02F 1/1333* (2006.01)
 *G02F 1/1343* (2006.01)
(58) Field of Classification Search
 USPC .......................................................... 349/12
 See application file for complete search history.

(56) References Cited

U.S. PATENT DOCUMENTS

| | | | | |
|---|---|---|---|---|
| 2010/0302201 | A1* | 12/2010 | Ritter | G06F 3/044 345/174 |
| 2013/0321004 | A1* | 12/2013 | Chen | G01R 1/06 324/663 |

FOREIGN PATENT DOCUMENTS

| | | | |
|---|---|---|---|
| CN | 103006203 | A | 4/2013 |
| CN | 103092422 | A | 5/2013 |
| CN | 103294311 | A | 9/2013 |
| CN | 103455223 | A | 12/2013 |
| CN | 103941946 | A | 7/2014 |
| CN | 104007876 | A | 8/2014 |
| CN | 104777940 | A | 7/2015 |
| WO | 9733925 | A1 | 9/1997 |

OTHER PUBLICATIONS

Apr. 21, 2017—(CN) First Office Action Appn 201510219241.X with English Tran.

\* cited by examiner

TOUCH ELECTRODE LAYER AND TOUCH PANEL

The application is a U.S. National Phase Entry of International Application No. PCT/CN2016/076262 filed on Mar. 14, 2016, designating the United States of America and claiming priority to Chinese Patent Application No. 201510219241.X filed on Apr. 30, 2015. The present application claims priority to and the benefit of the above-identified applications and the above-identified applications are incorporated by reference herein in their entirety.

TECHNICAL FIELD

At least one embodiment of the present disclosure relates to a touch electrode layer and a touch panel.

BACKGROUND

With development of a display technology, a touch panel technology proceeds to a rapid development period. The touch panels mainly are divided into an on cell touch panel and an in cell touch panel. For the on cell touch panel, a touch electrode layer is arranged on an outer side of a display panel; and for the in cell touch panel, the touch electrode layer is arranged inside the display panel.

By taking a liquid crystal touch panel as an example, the touch electrode layer for example is arranged between an opposed substrate (which is opposite to an array substrate of a liquid crystal display panel, and for example, is a color filter substrate) and a polarizer of the liquid crystal display panel. For example, a preparation process of the touch electrode layer is that: after the array substrate and the opposed substrate (e.g., the color filter substrate) are bonded with each other to form the liquid crystal display panel, a transparent conductive film for example is deposited on the surface of the opposed substrate facing away from the array substrate and is processed by a single patterning process to form the touch electrode layer.

SUMMARY

According to embodiments of the disclosure, a touch electrode layer is provided. The touch electrode layer comprises a first touch electrode and a second touch electrode. At least part of the first touch electrode is surrounded by the second touch electrode so that the first touch electrode has a first touch electrode portion surrounded by the second touch electrode, and a first touch electrode portion surrounded by the second touch electrode is of a circular or oval shape; a first gap is formed between the first touch electrode portion and the second touch electrode which surrounds the first touch electrode portion; and the first touch electrode and the second touch electrode are arranged in a same layer.

For example, a material for forming both the first touch electrode and the second touch electrode is a transparent conductive material.

For example, the first gap has an equal width at all positions.

For example, the second touch electrode includes an opening; the first touch electrode includes a first portion, a second portion and a third portion, the first portion is surrounded by the second touch electrode so as to be the first touch electrode portion, the second portion is positioned at the position of the opening of the second touch electrode, and the first portion is connected with the third portion by the second portion; and at the position of the opening, a second gap is formed between the second touch electrode and the second portion of the first touch electrode, and the second gap is of an arc shape.

For example, along a first direction, two adjacent second touch electrodes are arranged in a pair; along the first direction, the first touch electrode is arranged on both sides of the pair of the two adjacent second touch electrodes; along a second direction, a third gap is formed between two adjacent first touch electrodes; along the second direction, a fourth gap is formed between two adjacent second touch electrodes; and the first direction and the second direction are different directions.

For example, the first touch electrode further comprises a portion arranged in the fourth gap.

For example, the touch electrode layer further comprises a first touch electrode wire connected with the first touch electrode and arranged in a same layer with the first touch electrode, and a second touch electrode wire connected with the second touch electrode and arranged in a same layer with the second touch electrode.

For example, a width of the first gap is greater than or equal to 6 microns.

According to embodiments of the disclosure, a touch electrode layer is provided. The touch electrode layer comprises a first touch electrode and a second touch electrode which are arranged in a same layer, wherein the first touch electrode includes a first touch electrode portion surrounded by the second touch electrode, an edge of the first touch electrode portion is a curved edge, and a gap is formed between the first touch electrode portion and the second touch electrode which surrounds the first touch electrode portion.

For example, an edge of the second touch electrode, which surrounds the first touch electrode portion, is a curved edge.

According to embodiments of the disclosure, a touch panel is provided. The touch panel comprises: a display panel; and the touch electrode layer as described above.

For example, the touch electrode layer is arranged on an outer side of the display panel.

For example, the display panel includes an array substrate, an opposed substrate and a liquid crystal layer positioned between the array substrate and the opposed substrate; the touch panel further includes a lower polarizer arranged on a side close to the array substrate and an upper polarizer arranged on a side close to the opposed substrate; and the touch electrode layer is arranged between the opposed substrate and the upper polarizer.

For example, the touch panel further comprises a protection substrate. The touch electrode layer is arranged between the protection substrate and the display panel, and the touch electrode layer is in contact with the protection substrate.

For example, the touch panel further comprises a protection substrate. The touch electrode layer is arranged on a thin film, and the thin film is arranged between the protection substrate and the display panel.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Figure 1A:
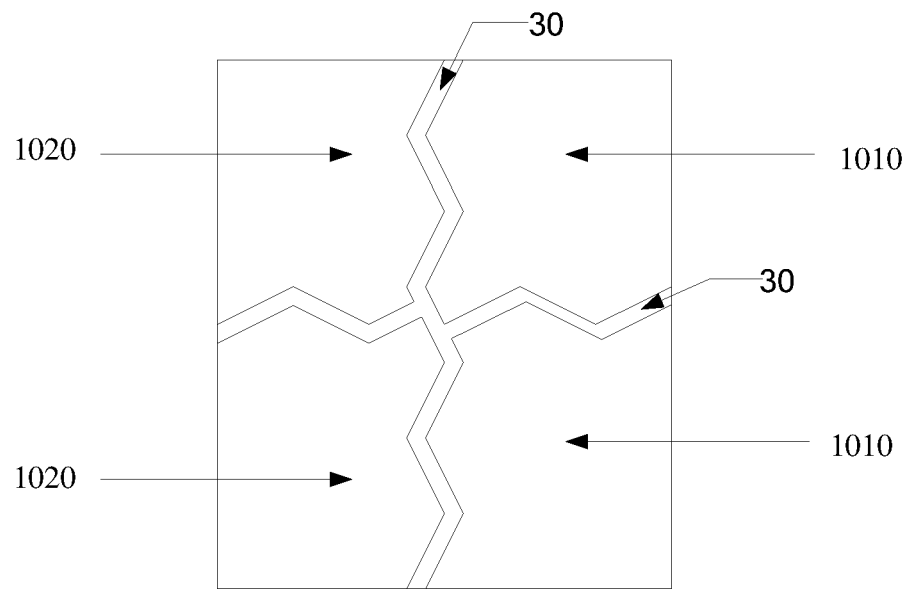
FIG. 1a is a first structural schematic view illustrating a first touch electrode, a second touch electrode and a groove therebetween according to one technique.
Figure 1B:
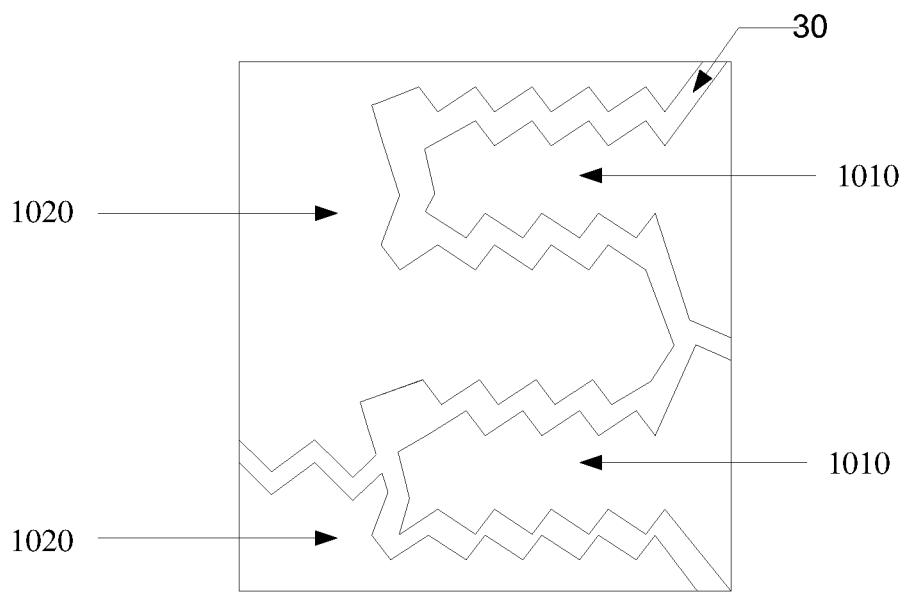
FIG. 1b is a second structural schematic view illustrating the first touch electrode, the second touch electrode and the groove therebetween according to one technique.

By taking a liquid crystal touch panel as an example, a touch electrode layer, formed by depositing a transparent conductive film on a surface of an opposed substrate of a liquid crystal display panel and patterning the transparent conductive film by a single patterning process, includes a first touch electrode 1010 and a second touch electrode 1020 as shown in FIG. 1a or FIG. 1b.

Figure 2:
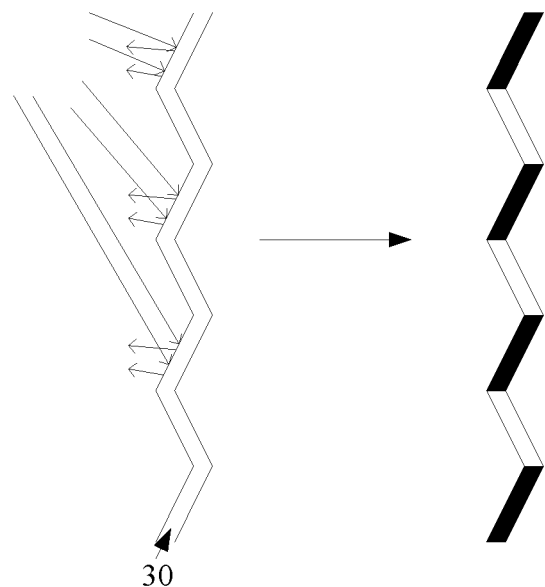
FIG. 2 is a schematic view illustrating regular reflections at different positions of the groove under the irradiation of light in the structures of FIG. 1a or FIG. 1b.

The touch electrodes need to be insulated from each other, and thus, in an etching process of the patterning process, grooves 30 are formed between the touch electrodes. Due to influence of factors such as material, thickness, process capability of a production line and the like of the transparent conductive film, widths of these grooves 30 are mostly over 6 µm. Based on this, as shown in FIG. 2, in the case that a display substrate is not turned on or is turned on at a low gray level, under the irradiation of ambient light, the grooves 30 at different positions regularly reflect the light, which generates apparent alternately-arranged dark and bright stripes, and thus causes a difficulty in shadow elimination, and the difficulty in shadow elimination is very difficult to thoroughly solve by adjustment of an etching process.

At least one embodiment of the present disclosure provides a touch electrode layer 10. As shown in FIG. 3 to FIG. 7, the touch electrode layer 10 includes a first touch electrode 101 and a second touch electrode 102; at least a part of the first touch electrode 101 is surrounded by the second touch electrode 102 so that the first touch electrode 101 has a first touch electrode portion 1011 surrounded by the second touch electrode 102, and the first touch electrode portion 1011 surrounded by the second touch electrode 102 is of a circular or oval shape; a first gap 103 is formed between the circular or oval first touch electrode portion 1011 and the second touch electrode 102 which surrounds the first touch electrode portion 1011; and the first touch electrode 101 and the second touch electrode 102 are arranged in a same layer.

For example, a material for forming both the first touch electrode 101 and the second touch electrode 102 is a transparent conductive material, so that influence on transmittance of a display apparatus is avoided in the case that the touch electrode layer is applied to the display apparatus. For example, the material for forming the first touch electrode 101 and the second touch electrode 102 is non-transparent, and in this case, the first and second touch electrodes are arranged in a non-display region of the display apparatus so as to avoid influence on transmittance.

Figure 4:
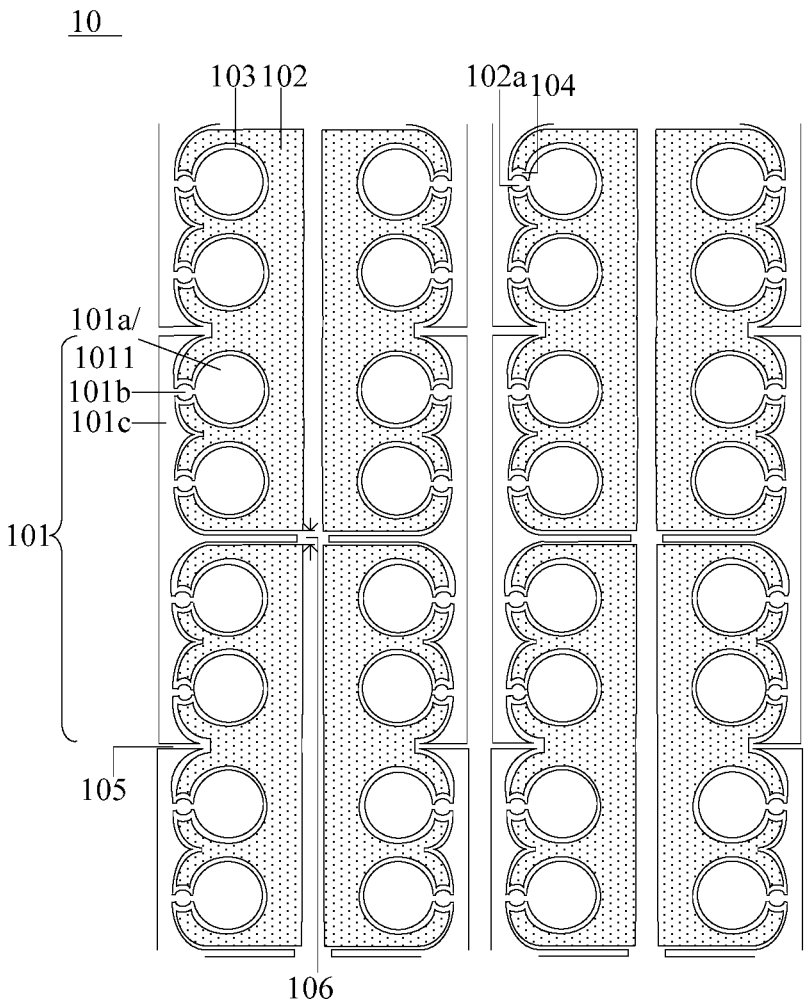
FIG. 4 is a second structural schematic view illustrating the touch electrode layer provided by the embodiments of the present disclosure.
Figure 5:
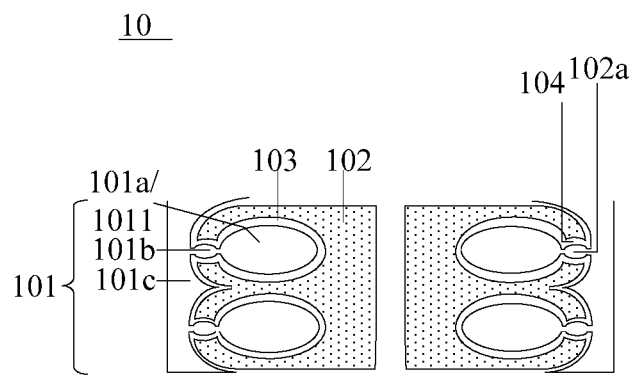
FIG. 5 is a first structural schematic view illustrating a first touch electrode and a second touch electrode in the touch electrode layer provided by the embodiments of the present disclosure.
Figure 6:
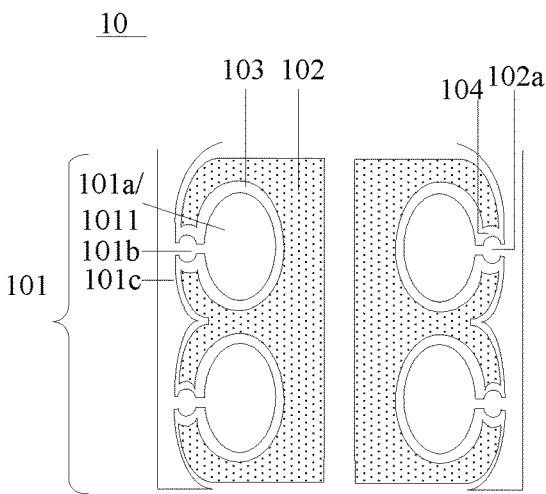
FIG. 6 is a second structural schematic view illustrating the first touch electrode and the second touch electrode in the touch electrode layer provided by the embodiments of the present disclosure.

It should be noted that, as shown in FIG. 4 to FIG. 6, "at least a part of the first touch electrode 101 is surrounded by the second touch electrode 102", means that only a part of the first touch electrode 101 is surrounded by the second touch electrode 102.

In the case that only a part of the first touch electrode 101 is surrounded by the second touch electrode 102, the first gap 103 between the circular or oval first touch electrode portion 1011 and the second touch electrode 102 which surrounds the first touch electrode portion 1011 is unclosed. Namely, except the circular or oval portion surrounded by the second touch electrode 102, the first touch electrode 101 further includes other portions which are not surrounded by the second touch electrode 102; for one first touch electrode 101, the circular or oval portion surrounded by the second touch electrode 102 and other portions which are not surrounded by the second touch electrode 102 should be connected with each other, and thus, in a case of ensuring insulation between the first touch electrode 101 and the second touch electrode 102, the second touch electrode 102 needs to include an opening capable of enabling other portions of the first touch electrode 101 which are not surrounded by the second touch electrode 102 and the circular or oval portion of the first touch electrode 101 surrounded by the second touch electrode 102 to be connected with each other, so that the first gap 103 cannot be closed.

Further, the first touch electrode portion 1011 surrounded by the second touch electrode 102 is of a circular or oval shape, and thus, a shape of an inner edge of the first gap 103, which is in contact with the first touch electrode portion 1011, is consistent with a shape of the first touch electrode portion 1011. Further, due to existence of the opening 102a (with reference to FIG. 4 to FIG. 7) of the second touch electrode 102, the shape of the inner edge of the first gap 103 is consistent with that of the first touch electrode portion 1011 at all positions except the position of the opening 102a. It should be noted that, the closer the shape of the inner edge of the first gap 103 is to be closed, i.e., the closer the shape of the inner edge of the first gap 103 is to the circular or oval shape, the lower the regularity of light reflected back under the irradiation of the light is. Though the inner edge of the first gap 103 in FIG. 4 to FIG. 7 is not closed, the inner edge of the first gap 103 is approximately closed.

Figure 3:
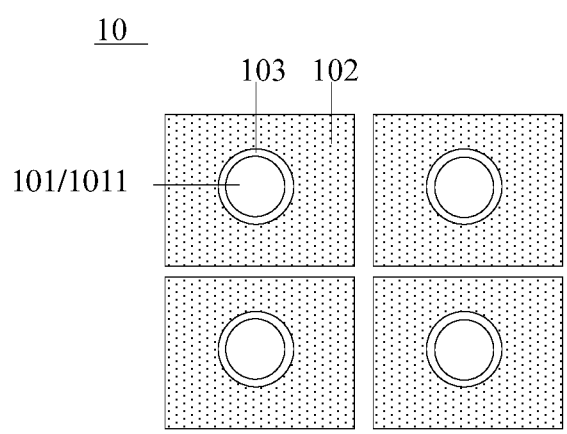
FIG. 3 is a first structural schematic view illustrating a touch electrode layer provided by embodiments of the present disclosure.

Further, as shown in FIG. 3, "at least a part of the first touch electrode 101 is surrounded by the second touch electrode 102", means that an entirety of the first touch electrode 101 is surrounded by the second touch electrode 102. On this basis, the first gap 103 is closed.

It should be noted that, the first touch electrode 101 and the second touch electrode 102 are arranged in a same layer, i.e., the first touch electrode 101 and the second touch electrode 102 are formed by a single patterning process (i.e., a patterning process carried out on a same thin film).

It should be noted that, in a case that at least part of the first touch electrode 101 is surrounded by the second touch electrode 102, the first touch electrode 101 at least includes one circular or oval portion (i.e., at least one first touch electrode portion 1011) surrounded by the second touch electrode 102. On this basis, at least one first gap 103 is formed between the first touch electrode 101 and its corresponding second touch electrode 102.

The embodiments of the present disclosure provide the touch electrode layer 10. The first touch electrode portion 1011 surrounded by the second touch electrode 102 is of the circular or oval shape, and thus, the inner edge of the first gap 103 between the first touch electrode 101 surrounded by the second touch electrode 102 and the second touch electrode 102 is of a closed or approximately closed circular or oval shape, so that in the case that light is irradiated to the inner edge of the first gap 103, the reflected light has no regularity and accordingly, the shadow elimination difficulty caused by regular reflection of the groove between the touch electrodes in FIG. 1a and FIG. 1b is reduced to a certain degree. In addition, the above-mentioned surrounding mode adopted to design the first touch electrode 101 and the second touch electrode 102, compared to a mode shown in FIG. 1a and FIG. 1b, greatly increases an opposite area of the first touch electrode 101 and the second touch electrode 102, so that an amount of touch signals is effectively increased and touch performance is improved.

For example, the first gap 103 has an equal width at all positions. Namely, an outer edge (i.e., a edge of the first gap 103, which is in contact with the second touch electrode 102) of the first gap 103 is of a closed circular shape or approximately closed circular shape, and the first gap 103 is of a circular ring shape or is approximately of a circular ring shape; or, the outer edge of the first gap 103 is of a closed oval shape or approximately closed oval shape, and the first gap 103 is of an oval ring shape or is approximately of an oval ring shape.

Exemplarily, as shown in FIG. 3, an entirety of the first touch electrode 101 is surrounded by the second touch electrode 102, the first touch electrode 101 is of a circular shape, and the circular ring shaped first gap 103 is formed between the circular first touch electrode 101 and the second touch electrode 102 which surrounds the first touch electrode 101.

Figure 8:
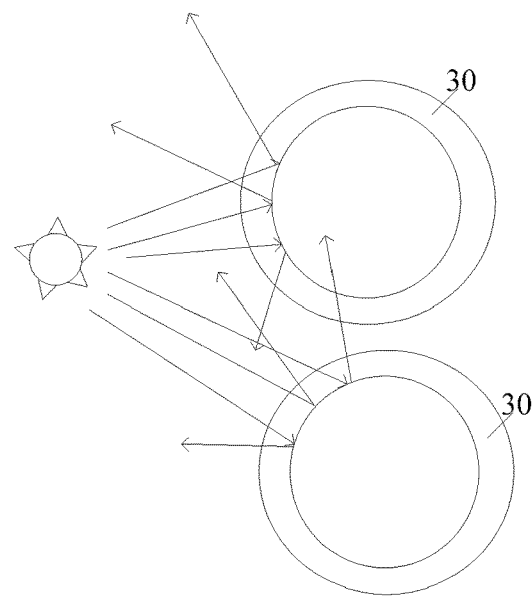
FIG. 8 is a schematic view illustrating irregular reflections under the radiation of light in the case of employing the touch electrode layer provided by the embodiments of the present disclosure.

On this basis, as shown in FIG. 8, no matter which direction light is irradiated from and whether the light is irradiated to the inner edge or the outer edge of the first gap 103, the light reflected by the first gap 103 has no regular directivity, and reflection of the light is similar with a diffuse reflection, and thus, the structure shown in FIG. 3 can solve the shadow elimination difficulty better.

Exemplarily, as shown in FIG. 4, only a part of the first touch electrode 101 is surrounded by the second touch electrode 102, the first touch electrode portion 1011 surrounded by the second touch electrode 102 is of a circular shape, and the circular first touch electrode portion 1011 surrounded by the second touch electrode 102 and other portions of the first touch electrode 101 which are not surrounded by the second touch electrode 102 are connected with each other at the opening of the second touch electrode 102; and the approximately circular first gap 103 is formed between the circular first touch electrode portion 1011 and the second touch electrode 102 which surrounds the first touch electrode portion 1011.

On this basis, similar with FIG. 8, no matter which direction the light is irradiated from and whether the light is irradiated to the inner edge or the outer edge of the first gap 103, the light reflected by the first gap 103 has no regular directivity, and reflection of the light is similar with the diffuse reflection, and thus, the structure shown in FIG. 4 can solve the shadow elimination difficulty better.

Exemplarily, as shown in FIG. 5 and FIG. 6, only a part of the first touch electrode 101 is surrounded by the second touch electrode 102, the first touch electrode portion 1011 surrounded by the second touch electrode 102 is of an oval shape, and the oval first touch electrode portion 1011 surrounded by the second touch electrode 102 and other portions of the first touch electrode 101 which are not surrounded by the second touch electrode 102 are connected with each other at the opening of the second touch electrode 102; and the approximately oval first gap 103 is formed between the oval first touch electrode portion 1011 and the second touch electrode 102 which surrounds the first touch electrode portion 1011.

On this basis, similar with FIG. 8, no matter which direction the light is irradiated from and whether the light is irradiated to the inner edge or the outer edge of the first gap 103, the light reflected by the first gap 103 has no regular directivity, and reflection of the light is similar with the diffuse reflection, and thus, the structures shown in FIG. 5 and FIG. 6 can solve the shadow elimination difficulty better.

It should be noted that for the oval first touch electrode portion 1011 in FIG. 5 and FIG. 6, a specific shape of the oval may be regulated by regulating a proportion of long and short axes of the first touch electrode portion 1011, which is not limited herein, as long as the light reflected by the first gap 103 has no regularity after the light is irradiated to the first gap.

In the embodiments of the disclosure, as shown in FIG. 4 to FIG. 6, the first touch electrode 101 is not only include the portion surrounded by the second touch electrode 102; and thus, as shown in FIG. 4 to FIG. 6, only a part of the first touch electrode 101 is surrounded by the second touch electrode 102, i.e., the second touch electrode 102 includes the opening 102a, and the first touch electrode 101 includes a first portion 101a, a second portion 101b and a third portion 101c; the first portion 101a is surrounded by the second touch electrode 102, and the first portion 101a and the third portion 101c are connected by the second portion 101b positioned at the position of the opening 102a of the second touch electrode 102; and at the position of the opening 102a, a second gap 104 between the second touch electrode 102 and the second portion 101b of the first touch electrode 101 is of an arc shape.

In this way, a regular reflection generated by the gaps between the touch electrodes can be further avoided.

Further, for example, as shown in FIG. 4, along a first direction (for example, a horizontal direction in the drawing), two adjacent second touch electrodes 102 are arranged in a pair; the first touch electrode 101 is arranged on both sides of the pair of the two adjacent second touch electrodes along the first direction; along a second direction (for example, a longitudinal direction in the drawing), a third gap 105 is formed between two adjacent first touch electrodes 101, and the third gap 105 is positioned at a middle portion of its corresponding second touch electrode 102; along the second direction, a fourth gap 106 is formed between two adjacent second touch electrodes 102; and the first direction and the second direction are different directions.

Herein, for example, the first touch electrode 101 includes four circular or oval first portions 101a, and the second touch electrode 102 includes four surrounding portions so as to ensure better touch performance.

For example, with reference to FIG. 4, the first touch electrode 101 and the second touch electrode 102 are arranged in a mode as follows: along the second direction, two of the circular or oval first portions 101a of at least one first touch electrode 101 are surrounded by two surrounding portions of one second touch electrode 102, and the other two of the circular or oval first portions 101a of the at least one first touch electrode 101 are surrounded by two surrounding portions of another second touch electrode 102; and two of the surrounding portions of at least one second touch electrode 102 surround two circular or oval first portions 101a of one first touch electrode 101, and the other two of the surrounding portions of the at least one second touch electrode 102 surround two circular or oval first portions 101a of another first touch electrode 101. Namely, along the second direction, the third gap 105 and the fourth gap 106 are staggered from each other.

In the embodiments of the present disclosure, the first touch electrode 101 and the second touch electrode 102 are designed into a general 1T2R (one touch drive electrode corresponds to two touch sense electrodes) mode, and thus are applicable to different touch Integrated Circuit (IC) of various manufacturers. Compared with a case that the IC of one manufacturer currently corresponds to a pattern of one type of touch electrode layer and a mask needs to be developed every time when one type of IC is verified, resulting in problems of high development cost and influence on selectivity of future volume production of the IC and the like, the embodiments of the present disclosure can avoid cost increase caused by development of the new IC, and thus, a pattern of the touch electrode layer 10 in the embodiments of the present disclosure can be popularized in a large scale.

Further, for example, as shown in FIG. 4, along the second direction, the first touch electrode 101 further includes a portion arranged in the fourth gap 106. Therefore, the opposite area of the first touch electrode 101 and the second touch electrode 102 is further increased so as to improve the touch signal quantity.

Figure 7:
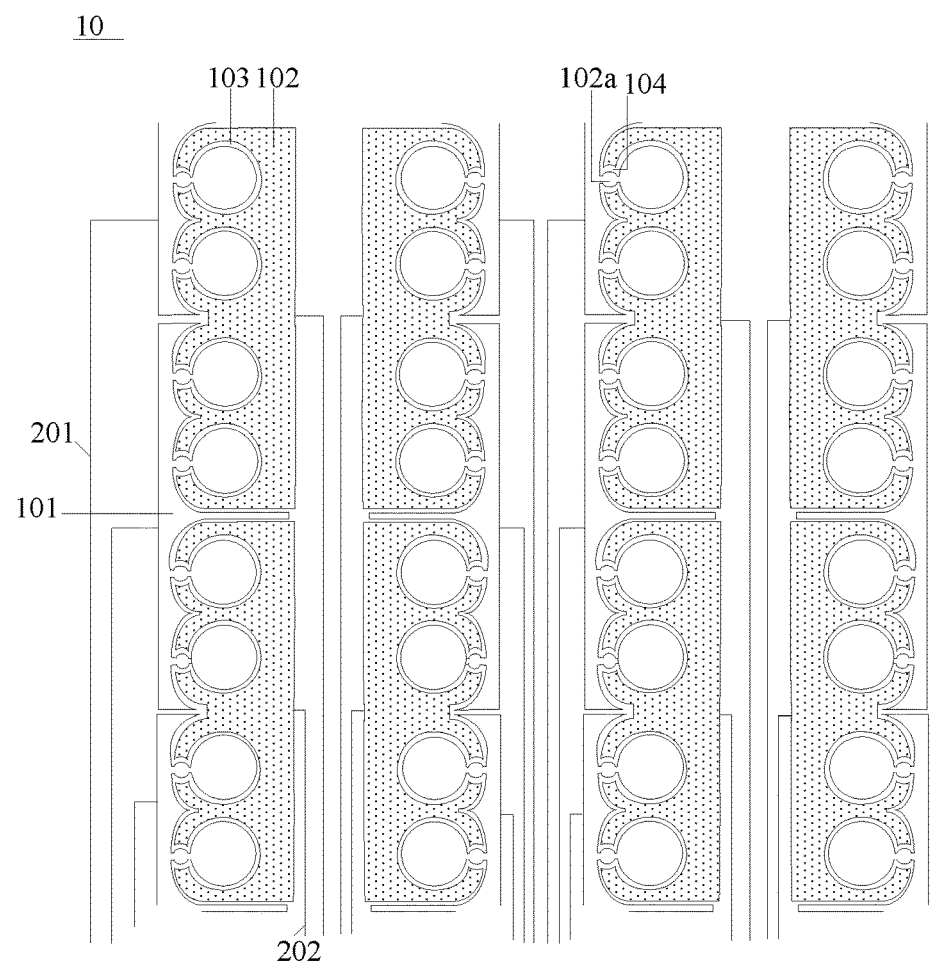
FIG. 7 is a third structural schematic view illustrating the touch electrode layer provided by the embodiments of the present disclosure.

Based on any one of the above-mentioned embodiments, as shown in FIG. 7, for example, the touch electrode layer 10 further includes a first touch electrode wire 201 connected with the first touch electrode 101 and arranged in a same layer with the first touch electrode 101, and a second touch electrode wire 202 connected with the second touch electrode 102 and arranged in a same layer with the second touch electrode 102. Therefore, by the single patterning process, not only the first touch electrode 101 and the second touch electrode 102, but also the first touch electrode wire 201 and the second touch electrode wire 202 are formed, and thus, increase of numbers of the patterning processes is avoided.

For example, the touch electrode layer provided by the embodiments of the present disclosure is applied to a case that a width of the groove between the first touch electrode and the second touch electrode in the touch electrode layer is over 6 μm, i.e., the width of the first gap 103 is greater than or equal to 6 microns.

Figure 9:
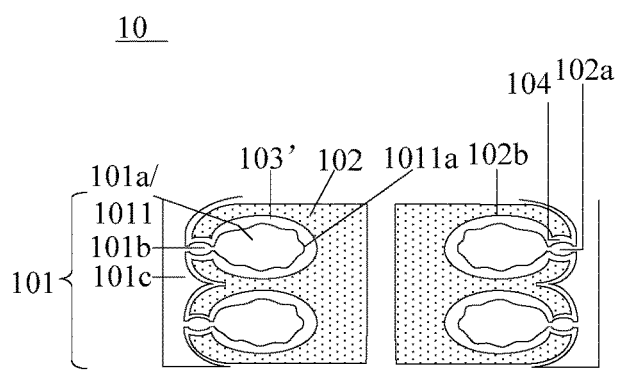
FIG. 9 is a structural schematic view illustrating the touch electrode layer provided by the embodiments of the present disclosure.

At least one embodiment of the present disclosure further provides a touch electrode layer. As shown in FIG. 9, the touch electrode layer 10 includes a first touch electrode 101 and a second touch electrode 102 which are arranged in a same layer; and the first touch electrode 101 includes a first touch electrode portion 1011 surrounded by the second touch electrode 102, an edge 1011a of the first touch electrode portion 1011 is a curved edge, and a gap 103' is formed between the first touch electrode portion 1011 and the second touch electrode 102 which surrounds the first touch electrode portion 1011. For example, the curved edge 1011a is irregular curved edge.

For example, an edge 102b of the second touch electrode 102 which surrounds the first touch electrode portion 1011 is a curved edge.

It should be noted that the curved edge in the embodiments of the present disclosure is a circular edge, an oval edge or other curved edges, as long as a curvature of a random position of the curved edge is greater than 0. Moreover, arrangement of the first touch electrode, the second touch electrode, the first touch electrode portion and the gap in the embodiment of FIG. 7 can refer to related description in the touch electrode layer provided by any one of the above-mentioned embodiments, and is not repeated herein.

At least one embodiment of the present disclosure further provides a touch panel. The touch panel includes a display panel and the touch electrode layer 10 provided by any one of the above-mentioned embodiments.

For example, the touch electrode layer 10 is positioned on an outer side of the display panel, i.e., the touch panel is an on cell touch panel. For example, the touch electrode layer 10 is provided inside the display panel, i.e., the touch panel is an in cell touch panel. The position of the touch electrode layer 10 may be set according to the practical situation, which is not limited here.

It should be noted that in the embodiments of the present disclosure, the type of the display panel is not limited, and the display panel for example is a liquid crystal display panel, an organic light-emitting diode display panel and the like and is not limited herein.

For example, the display panel is the liquid crystal display panel, an array substrate in the display panel includes a thin film transistor and a pixel electrode electrically connected with a drain electrode of the thin film transistor. For example, the array substrate further includes a common electrode. For an In-Plane Switch (IPS) array substrate, the pixel electrode and the common electrode are arranged at an interval in a same layer and are both strip electrodes; and for an Advanced-super Dimensional Switching (ADS) array substrate, the pixel electrode and the common electrode are arranged in different layers, the electrode on an upper layer is a strip electrode, and the electrode on a lower layer is a plate electrode. For example, the display panel further includes an opposed substrate, e.g., a color filter substrate.

For example, the display panel is the Organic Light-Emitting Diode (OLED) display panel, an array substrate in the display panel includes a transistor (e.g., a thin film transistor) and an anode electrically connected with a drain electrode of the transistor, and further includes a cathode and an organic material functional layer. The organic material functional layer at least includes a light-emitting layer. For example, the organic material functional layer further includes an electron transport layer and a hole transport layer. For example, in order to improve efficiency of injecting electrons and holes into the light-emitting layer, the organic material functional layer further includes an electron injection layer arranged between the cathode and the electron transport layer, and a hole injection layer arranged between the anode and the hole transport layer. For example, the display panel further includes a packaging layer, and the packaging layer for example is a thin film package or a substrate package.

In the touch panel provided by the embodiments of the present disclosure, the first touch electrode portion 1011 surrounded by the second touch electrode 102 is of the circular or oval shape, and thus, the inner edge of the first gap 103 between the first touch electrode 101 surrounded by the second touch electrode 102 and the second touch electrode 102 is of a closed or approximately closed circular or oval shape, so that in the case that light is irradiated to the inner edge of the first gap 103, the reflected light has no regularity and accordingly, the shadow elimination difficulty caused by regular reflection of the groove between the touch electrodes in FIG. 1a and FIG. 1b is reduced to a certain degree. In addition, the above-mentioned surrounding mode adopted to design the first touch electrode 101 and the second touch electrode 102, compared to a mode shown in FIG. 1a and FIG. 1b, greatly increases an opposite area of the first touch electrode 101 and the second touch electrode 102, so that an amount of touch signals is effectively increased and touch performance is improved.

In consideration of the advantages of simple process, low manufacturing cost and the like of the on cell touch panel, preferably, the touch panel is the on cell touch panel, i.e., the touch electrode layer 10 is arranged on the outer side of the display panel.

Figure 10A:
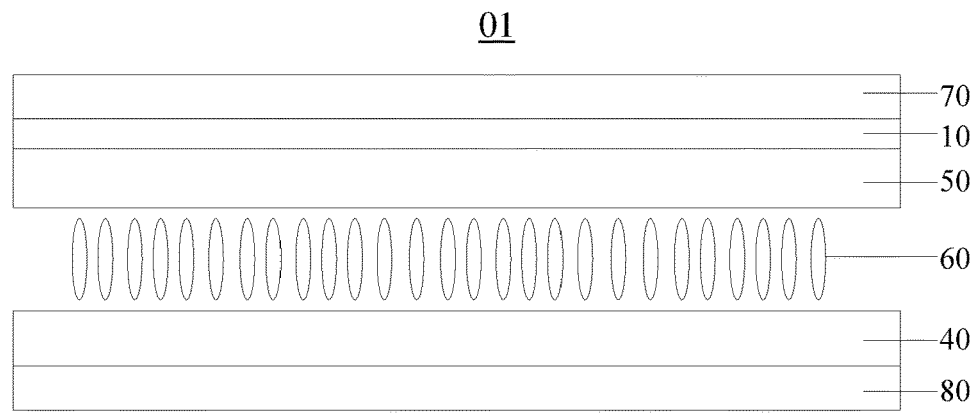
FIG. 10a is a structural schematic view illustrating a touch panel provided by the embodiments of the present disclosure.

For example, in a case that the display panel is the liquid crystal display panel, i.e., as shown in FIG. 10a, in a case that the display panel 01 includes the array substrate 40, the opposed substrate (e.g., the color filter substrate) 50 and a liquid crystal layer 60 positioned between the array substrate 40 and the opposed substrate 50, the touch panel provided by at least one embodiment of the present disclosure further includes a lower polarizer 80 arranged on a side close to the array substrate 40 and an upper polarizer arranged on a side close to the opposed substrate 50, and for example, the touch electrode layer 10 is arranged between the opposed substrate 50 and the upper polarizer 70. For example, the opposed substrate 50 is one of other substrates without a color filter layer, e.g., a transparent substrate, which the embodiments of the present disclosure include, but are not limited thereto.

Figure 10B:
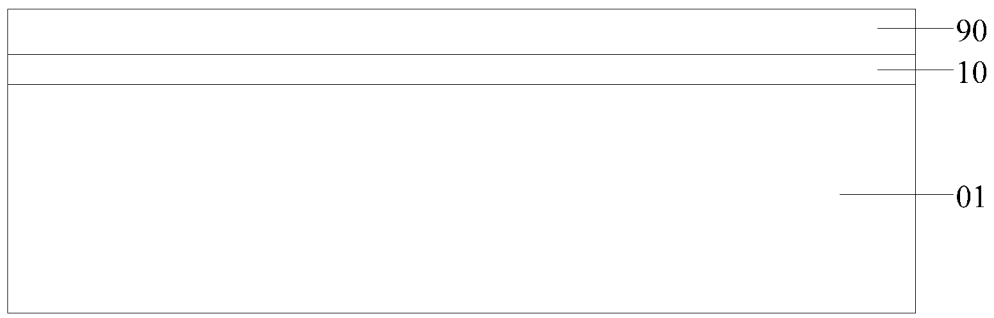
FIG. 10b is a structural schematic view illustrating another touch panel provided by the embodiments of the present disclosure.

For example, as shown in FIG. 10b, the touch panel includes a protection substrate 90, the touch electrode layer 10 is arranged between the protection substrate 90 and the display panel 01, and the touch electrode layer 10 is in contact with the protection substrate 90. For example, the protection substrate 90 is a glass substrate, a quartz substrate or a plastic substrate and the like, and the embodiments of the present disclosure include, but are not limited to, these modes. For example, the touch electrode layer 10 is firstly formed on the protection substrate 90, then an assembling process of the protection substrate 90 and the display panel 01 is carried out, and the touch electrode layer 10 formed on the protection substrate 90 is arranged between the protection substrate 90 and the display panel 01.

Figure 10C:
FIG. 10c is a structural schematic view illustrating yet another touch panel provided by the embodiments of the present disclosure.

For example, as shown in FIG. 10c, the touch electrode layer 10 is firstly formed on a thin film 20, then the thin film 20 on which the touch electrode layer is formed is adhered to the protection substrate 90, finally, the assembling process of the protection substrate 90 and the display panel 01 is carried out, and the touch electrode layer 10 formed on the protection substrate 90 is arranged between the protection substrate 90 and the display panel 01.

The foregoing embodiments merely are exemplary embodiments of the disclosure, and not intended to define the scope of the disclosure, and the scope of the disclosure is determined by the appended claims.

The present application claims priority of the Chinese Patent Application No. 201510219241.X filed on Apr. 30, 2015, the disclosure of which are incorporated herein by its reference in its entirety as part of the present application.

The invention claimed is:

1. A touch electrode layer, comprising a plurality of first touch electrodes and a plurality of second touch electrodes, wherein at least a part of one of the plurality of first touch electrodes is surrounded by one of the plurality of second touch electrodes so that the one of the plurality of first touch electrodes has a first touch electrode portion surrounded by the one of the plurality of second touch electrodes, and the first touch electrode portion surrounded by the one of the plurality of second touch electrodes is of a circular or oval shape;

a first gap is between the first touch electrode portion and the one of the plurality of second touch electrodes which surrounds the first touch electrode portion;

the plurality of first touch electrodes and the plurality of second touch electrodes are arranged in a same layer, along a first direction, two adjacent second touch electrodes, which are adjacent to each other along the first direction, disconnected from each other are arranged in a pair;

along the first direction, two adjacent first touch electrodes, which are adjacent to each other along the first direction, are arranged on two opposite sides of the pair of the two adjacent second touch electrodes, and one first touch electrode of the two adjacent first touch electrodes arranged on one of the two opposite sides of the pair of the two adjacent second touch electrodes is disconnected from the other first touch electrode of the two adjacent first touch electrodes arranged on the other of the two opposite sides of the pair of the two adjacent second touch electrodes;

along a second direction, a third gap is between another two adjacent first touch electrodes which are adjacent to each other along the second direction, disconnected from each other, the first direction and the second direction are different directions;

along the second direction, a fourth gap is between another two adjacent second touch electrodes, which are adjacent to each other along the second direction, disconnected from each other;

along the first direction, the two adjacent first touch electrodes disconnected from each other are arranged in a pair; and along the first direction, the two adjacent second touch electrodes, which are disconnected from each other, are provided between the two adjacent first touch electrodes arranged in the pair.

2. The touch electrode layer according to claim 1, wherein a material for forming both the first touch electrodes and the second touch electrodes is a transparent conductive material.

3. The touch electrode layer according to claim 1, wherein the first gap has an equal width at all positions.

4. The touch electrode layer according to claim 1, wherein
the one of the plurality of second touch electrodes includes an opening;
the one of the plurality of first touch electrodes includes a first portion, a second portion and a third portion, the first portion is surrounded by the one of the plurality of second touch electrodes so as to be the first touch electrode portion, the second portion is positioned at the position of the opening of the one of the plurality of second touch electrodes, and the first portion is connected with the third portion by the second portion; and
at the position of the opening, a second gap is between the one of the plurality of second touch electrodes and the second portion of the one of the plurality of first touch electrodes, and the second gap is of an arc shape.

5. The touch electrode layer according to claim 1, wherein the one of the plurality of the first touch electrodes further comprises a portion arranged in the fourth gap.

6. The touch electrode layer according to claim 1, further comprising a plurality of first touch electrode wires respectively connected with the plurality of first touch electrodes and arranged in a same layer with the plurality of first touch electrodes, and a plurality of second touch electrode wires respectively connected with the plurality of second touch electrodes and arranged in a same layer with the plurality of second touch electrodes.

7. The touch electrode layer according to claim 1, wherein a width of the first gap is greater than or equal to 6 microns.

8. The touch electrode layer according to claim 1, wherein along the second direction, the third gap and the fourth gap are alternated with each other.

9. The touch electrode layer according to claim 1, wherein the third gap is positioned at a middle portion of its corresponding second touch electrode.

10. A touch panel, comprising:
a display panel; and
the touch electrode layer according to claim 1.

11. The touch panel according to claim 10, wherein the touch electrode layer is arranged on an outer side of the display panel.

12. The touch panel according to claim 11, wherein
the display panel includes an array substrate, an opposed substrate and a liquid crystal layer positioned between the array substrate and the opposed substrate;
the touch panel further includes a lower polarizer arranged on a side close to the array substrate and an upper polarizer arranged on a side close to the opposed substrate; and
the touch electrode layer is arranged between the opposed substrate and the upper polarizer.

13. The touch panel according to claim 11, further comprising a protection substrate, wherein the touch electrode layer is arranged between the protection substrate and the display panel, and the touch electrode layer is in contact with the protection substrate.

14. The touch panel according to claim 11, further comprising a protection substrate, wherein
the touch electrode layer is arranged on a thin film, and the thin film is arranged between the protection substrate and the display panel.

15. A touch electrode layer, comprising a plurality of first touch electrodes and a plurality of second touch electrodes which are arranged in a same layer, wherein
one of the plurality of first touch electrodes includes a first touch electrode portion surrounded by one of the plurality of second touch electrodes, an edge of the first touch electrode portion is a curved edge, and a gap is between the first touch electrode portion and the one of the plurality of second touch electrodes which surrounds the first touch electrode portion,
along a first direction, two adjacent second touch electrodes, which are adjacent to each other along the first direction, disconnected from each other are arranged in a pair;
along the first direction, two adjacent first touch electrodes, which are adjacent to each other along the first direction, are arranged on two opposite sides of the pair of the two adjacent second touch electrodes, and one first touch electrode of the two adjacent first touch electrodes arranged on one of the two opposite sides of the pair of the two adjacent second touch electrodes is disconnected from the other first touch electrode of the two adjacent first touch electrodes arranged on the other of the two opposite sides of the pair of the two adjacent second touch electrodes;
along a second direction, a third gap is between another two adjacent first touch electrodes which are adjacent to each other along the second direction, disconnected from each other, the first direction and the second direction are different directions;
along the second direction, a fourth gap is between another two adjacent second touch electrodes, which are adjacent to each other along the second direction, disconnected from each other;
along the first direction, the two adjacent first touch electrodes disconnected from each other are arranged in a pair; and
along the first direction, the two adjacent second touch electrodes, which are disconnected from each other, are provided between the two adjacent first touch electrodes arranged in the pair.

16. The touch electrode layer according to claim 15, wherein an edge of the one of the plurality of second touch electrodes, which surrounds the first touch electrode portion, is a curved edge.

17. A touch panel, comprising:
a display panel; and
the touch electrode layer according to claim 15.

* * * * *